US007537639B2

(12) United States Patent
De Vries et al.

(10) Patent No.: US 7,537,639 B2
(45) Date of Patent: *May 26, 2009

(54) METHOD OF COOLING MOLTEN METAL DURING FRACTIONAL CRYSTALLISATION

(75) Inventors: Paul Alexander De Vries, Heemstede (NL); Huibrecht Adriaan Wouters, Leiden (NL); Martinus Leonardus Rutten, Arnhem (NL); Volker Gerhard Aurich, Oosterbeek (NL); Johannes Hendrikus Ten Have, Bemmel (NL)

(73) Assignee: Aleris Switzerland GmbH, Schaffhausen (CH)

( * ) Notice: Subject to any disclaimer, the term of this patent is extended or adjusted under 35 U.S.C. 154(b) by 116 days.

This patent is subject to a terminal disclaimer.

(21) Appl. No.: 10/577,354

(22) PCT Filed: Nov. 10, 2004

(86) PCT No.: PCT/EP2004/012836

§ 371 (c)(1),
(2), (4) Date: May 3, 2007

(87) PCT Pub. No.: WO2005/049875

PCT Pub. Date: Jun. 2, 2005

(65) Prior Publication Data

US 2007/0272057 A1    Nov. 29, 2007

(30) Foreign Application Priority Data

Nov. 19, 2003    (EP)    ................... 03078689

(51) Int. Cl.
*C22B 9/02*    (2006.01)
*C22B 21/06*    (2006.01)

(52) U.S. Cl. .......................................... 75/588; 75/679

(58) Field of Classification Search .................. 75/588, 75/679

See application file for complete search history.

(56) References Cited

U.S. PATENT DOCUMENTS

| 1,562,090 A | 11/1925 | Hoopes |
| 1,938,101 A | 12/1933 | Hall |
| 3,211,547 A | 10/1965 | Jarrett et al. |
| 3,296,811 A | 1/1967 | Stoller |
| 3,303,019 A | 2/1967 | Jacobs |
| 3,308,666 A | 3/1967 | Anderson et al. |

(Continued)

FOREIGN PATENT DOCUMENTS

DE    258283    7/1988

(Continued)

OTHER PUBLICATIONS

Notice of Allowance, Mar. 18, 2008, for U.S. Appl. No. 10/488,042 to DeVries.

(Continued)

*Primary Examiner*—George Wyszomierski
*Assistant Examiner*—Tima M McGuthry-Banks
(74) *Attorney, Agent, or Firm*—Novak Druce + Quigg LLP

(57) ABSTRACT

Method of cooling an at most partially solidified molten metal during fractional crystallization wherein metal crystals formed have a purer composition than that of the molten metal. Salt in solid form is used to cool the at most partially solidified molten metal.

12 Claims, 3 Drawing Sheets

U.S. PATENT DOCUMENTS

| | | | |
|---|---|---|---|
| 3,671,229 | A | 6/1972 | Ferber et al. |
| 3,839,019 | A | 10/1974 | Bruno et al. |
| 3,840,219 | A | 10/1974 | Sheridan et al. |
| 3,840,364 | A | 10/1974 | Flemmings et al. |
| 3,849,119 | A | 11/1974 | Bruno et al. |
| 4,043,802 | A | 8/1977 | Esdaile et al. |
| 4,050,683 | A | 9/1977 | Langhammer |
| 4,099,965 | A | 7/1978 | Beguin et al. |
| 4,133,517 | A | 1/1979 | Esdaile et al. |
| 4,222,830 | A | 9/1980 | Dawless et al. |
| 4,239,606 | A | 12/1980 | Dawless et al. |
| 4,243,211 | A | 1/1981 | Leroy et al. |
| 4,273,627 | A | 6/1981 | Dawless et al. |
| 4,305,763 | A | 12/1981 | Quist et al. |
| 4,379,718 | A | 4/1983 | Grantham et al. |
| 4,411,747 | A | 10/1983 | Dawless et al. |
| 4,456,480 | A | 6/1984 | Wintenberger |
| 4,581,062 | A | 4/1986 | Boutin |
| 4,736,314 | A | 4/1988 | Riese et al. |
| 4,744,823 | A | 5/1988 | Raymond-Seraille |
| 4,781,771 | A | 11/1988 | Masumoto et al. |
| 5,057,150 | A * | 10/1991 | Reeve et al. .................. 75/671 |
| 5,160,532 | A | 11/1992 | Benz et al. |
| 5,221,377 | A | 6/1993 | Hunt, Jr. et al. |
| 5,312,498 | A | 5/1994 | Anderson |
| 5,405,427 | A | 4/1995 | Eckert |
| 5,427,602 | A | 6/1995 | DeYoung et al. |
| 5,741,348 | A | 4/1998 | Van Der Donk et al. |
| 5,968,223 | A | 10/1999 | Eckert |
| 6,143,070 | A | 11/2000 | Bliss et al. |
| 6,224,648 | B1 | 5/2001 | Verdoes et al. |
| 6,290,900 | B1 | 9/2001 | Hatano et al. |
| 6,355,085 | B1 | 3/2002 | Pillin et al. |
| 6,909,505 | B2 | 6/2005 | Lucas et al. |
| 7,419,530 | B2 * | 9/2008 | De Vries et al. .............. 75/414 |
| 7,442,228 | B2 | 10/2008 | DeVries |
| 2001/0031823 | A1 | 10/2001 | Atchetee et al. |
| 2004/0261572 | A1 | 12/2004 | De Vries |
| 2005/0039578 | A1 | 2/2005 | De Vries et al. |
| 2005/0145071 | A1 | 7/2005 | Cates |
| 2005/0178239 | A1 | 8/2005 | De Vries et al. |
| 2006/0162491 | A1 | 7/2006 | De Vries et al. |
| 2007/0023110 | A1 | 2/2007 | De Vries et al. |

FOREIGN PATENT DOCUMENTS

| | | |
|---|---|---|
| DE | 4325793 | 2/1995 |
| EP | 0099948 | 2/1984 |
| EP | 0375308 | 6/1990 |
| EP | 0587274 | 3/1994 |
| EP | 0696646 A2 | 2/1996 |
| EP | 0745693 | 12/1996 |
| EP | 0829552 | 3/1998 |
| EP | 1288319 | 3/2003 |
| EP | 1380659 | 1/2004 |
| FR | 1594154 | 6/1970 |
| GB | 0615590 | 1/1949 |
| GB | 885503 | 12/1961 |
| GB | 974829 | 11/1964 |
| GB | 1352567 | 5/1974 |
| GB | 2154315 | 9/1985 |
| JP | 52135797 | 11/1977 |
| JP | 55050442 | 4/1980 |
| JP | 57152435 | 9/1982 |
| JP | 59205424 | 5/1983 |
| JP | 58104132 | 6/1983 |
| JP | 59028538 | 2/1984 |
| JP | 60234930 | 11/1985 |
| JP | 7070666 | 3/1995 |
| RU | 2105084 | 2/1998 |
| RU | 2112065 C1 | 5/1998 |
| RU | 2112065 C2 * | 5/1998 |
| SU | 1589173 | 8/1990 |
| WO | 98/27240 A1 | 6/1998 |
| WO | 02052053 | 7/2002 |
| WO | 2004005558 A1 | 1/2004 |
| WO | 2004005559 A1 | 1/2004 |
| WO | 2005 095658 | 10/2005 |

OTHER PUBLICATIONS

Office Action, May 11, 2007, for U.S. Appl. No. 10/488,042 to DeVries.

Office Action, Oct. 16, 2007, for U.S. Appl. No. 10/488,042 to DeVries.

Office Action, Dec. 3, 2007, for U.S. Appl. No. 10/491,278 to DeVries.

Office Action, Jun. 26, 2007, for U.S. Appl. No. 10/491,278 to DeVries.

Office Action, Aug. 30, 2007, for U.S. Appl. No. 10/516,889 to DeVries et al.

Office Action, Jan. 31, 2008, for U.S. Appl. No. 10/516,889 to DeVries et al.

Notice of Allowance, Jan. 10, 2008, for U.S. Appl. No. 10/516,888 to DeVries et al.

Office Action, Jul. 18, 2007, for U.S. Appl. No. 10/516,888 to DeVries et al.

Hanumanth et al., "Particle Sedimentation During Processing of Liquid Metal-Matrix Composites", Metallurgical Transaction B., vol. 23B, pp. 753-763 (1992).

L.C. Bartel et al., An Electrical Resistivity Measurement in Molten Basalt During the 1983 Kilauea Eruption, Bull. Volcanol., vol. 46.3, pp. 271-276 (1983).

Jo Isenberg-O'Loughlin, "Taming the Thunder," Metal Producing, vol. 33, pp. 21-23 (Sep. 1994).

Office Action of Sep. 9, 2008 for U.S. Appl. No. 11/492,226 to De Vries.

Office Action of Sep. 3, 2008 for U.S. Appl. No. 11/516,888 to De Vries.

Notice of Allowance, Jun. 2, 2008, for U.S. Appl. No. 10/488,042 to DeVries.

Notice of Allowance, Jun. 2, 2008, for U.S. Appl. No. 10/516,888 to DeVries.

Office Action, May 30, 2008, for U.S. Appl. No. 10/516,889 to DeVries.

Perry's Chemical Engineers' Handbook, 7th ed., McGraw-Hill, 1997, pp. 18-5 to 18-13.

Fourth Int'l Symposium on Recycling of Metals and Engineered Materials TMS (The Minerals, Metals, and Materials Society) 2000, pp. 979-991, Refining of a 5xxx Series Aluminium Alloy Scrap by ALCOA Fractional Crystallization Process, by Ali Unal.

Unpublished U.S. Appl. No. 10/598,731, DeVries, filed Sep. 8, 2006.

Davis, J.R. (editor), ASM Specialty Handbook, Aluminum and Aluminum Alloys, pp. 207-216 (1993).

The proceedings of the Fourth International Symposium on Recycling of Metals and Engineered Materials, TMS 2000 Kahveci et al., "Refining of a 5XXX Series Aluminum Alloy Scrap By Alcoa Fractional Crystallization Process," pp. 979-991 (2000).

* cited by examiner

METHOD OF COOLING MOLTEN METAL DURING FRACTIONAL CRYSTALLISATION

This application is a § 371 National Stage Application of International Application No. PCT/EP2004/012836, filed on Nov. 10, 2004, claiming the priority of European Patent Application No. 03078689.0 filed on Nov. 19, 2003.

The invention relates to a method of cooling an at most partially solidified molten metal during fractional crystallisation.

Crystallisation methods and apparatus can be used to refine a metal (here used as an abbreviation for metal alloy) in which too high a concentration of a foreign element is present. This foreign element can be present because in the metal made from metal ore, the primary metal, too much of the foreign element is present, or because already used metal is recycled and the foreign element concentration in the scrap is too high. For example aluminium scrap can contain too much of the foreign elements Fe, Si or Mg for use for commercial purposes unless it is mixed with primary metal containing little of the foreign element(s).

During fractional crystallisation metal crystals are formed in the molten metal due to the cooling of the molten metal. The crystals have a composition that is purer than the composition of the molten metal that is used as a starting point or in other words the crystals contain less of the foreign element(s) per unit weight compared to the molten metal that is used as a starting point.

Conventional methods of cooling an at most partially solidified molten metal during fractional crystallisation involve cooling the walls of the crystallisation apparatus by, for example, embedding cooling pipes in the wall. These conventional methods however have the disadvantage that crystals grow on and encrust the cool surfaces. Cooling through the walls of the apparatus, can be supplemented by way of a cooling device using a cooling coil or such an arrangement which is inserted into the molten metal, however such a device will only cool the molten metal at one place and again the molten metal will crystallise on and around the device, hampering the cooling effect of the cooling device.

It is an object of the invention to provide an improved method of cooling an at most partially solidified molten metal during fractional crystallisation, particularly suitable for refinement of aluminium and suchlike metals having a high melting point.

It is another object of the invention to provide a method of cooling an at most partially solidified molten metal during fractional crystallisation with which the solid fraction and/or temperature of the at most partially solidified molten metal can be better controlled compared to the prior art.

It is still another object of the invention to provide a method of cooling an at most partially solidified molten metal during fractional crystallisation which improves the likelihood of the metal crystals remaining in suspension in the molten metal by for example reducing the risk of the metal crystals adhering to the walls of the vessel in which it is contained.

One or more of these objects are achieved by a method of cooling an at most partially solidified molten metal during fractional crystallisation wherein metal crystals formed have a purer composition than that of the molten metal characterised in that salt in solid form is used to cool the at most partially solidified molten metal.

The use of a solid salt to cool the molten metal is advantageous for a number of reasons. When using the method of the present invention the solid salt added absorbs a lot of energy from the molten metal as it warms up from the temperature at which it was added, e.g. approx 20° C., to the temperature of the at most partially solidified molten metal, but crystals are unlikely to form and attach themselves to the molten salt or solid salt particles which means that metal crystals formed remain in suspension in the molten metal. The method of the present invention also allows for accurate dosing of the desired amount of solid salt for cooling. Preferably 0.1 to 1 kg of salt is added to the molten metal per kg of refined metal crystals produced, to ensure sufficient cooling. More preferably 0.2 to 0.8 kg of salt is added to the molten metal per kg of refined metal crystals produced or even more preferably 0.3 to 0.6 kg of salt per kg of refined metal crystals produced.

The solid salt preferably melts at least partially during the cooling of the at most partially solidified molten metal as it preferably has a melting point below the melting point of the at most partially solidified molten metal. The solid salt thus absorbs heat from the molten metal as it warms up and as it melts. The molten salt can be chosen to be either heavier or lighter than the molten metal, so the molten metal will float on the heavier molten salt or the lighter molten salt will float on the molten metal, or both if two types of solid salt are used. The temperature of the molten salt can be measured and controlled to control the temperature of the molten metal, whereas when cooling through the walls of a crystallisation apparatus the temperature of the molten metal can be less accurately controlled. The molten salt does not form a surface on which crystals can form and attach themselves.

At least some of the salt is preferably removed, e.g. by tapping off, once it is molten thereby enabling more solid salt to be added and more cooling to occur.

The removed salt is preferably cooled and solidified for re-use. This makes the method cost effective and economical with resources, as the cooling means can be re-used.

The solid salt is preferably added from above and/or to below and/or into the at most partially molten metal. If solid salt is added from above and/or below the at most partially molten metal it may form a molten salt layer above and/or below the at least partially molten metal e.g. the salt may be added from above the at most partially molten metal and may form a molten salt layer below the at least partially molten metal. If solid salt is added from above and/or below the at most partially molten metal it may also cool an already existing molten salt layer thereby cooling the molten metal via the salt/molten metal interface. When solid salt is added into the at most partially molten metal it will directly cool the molten metal and encourage metal crystal formation.

The at most partially solidified molten metal is preferably stirred. By stirring the at most partially solidified molten metal the metal crystals are kept in suspension and the exchange of material between the metal crystals and the molten metal is enhanced.

The solid salt is preferably added to a vortex formed on the surface of the at most partially solidified molten metal by the motion of the stirrer. The solid salt is added into the vortex created by the rotating motion of the stirrer on the surface of the molten metal which draws the solid salt from the surface into the body of the at most partially solidified molten metal. The solid salt is thus added to the surface of the at most partially molten metal but ends up in the body of the at most partially molten metal where it directly cools the molten metal and encourages metal crystal formation.

The solid salt is preferably added through a means for stirring the at most partially solidified molten metal. The solid salt is thereby well distributed through the molten metal, the salt/metal contact surface is relatively large and the salt effectively encourages metal crystal formation by cooling the metal as it heats up and melts.

The solid salt once molten preferably has a lower density than that of the at most partially solidified molten metal so that it forms a layer on top of the at most partially solidified molten metal and can be easily removed e.g. by tapping off and reduces oxidation of the molten metal.

The solid salt preferably comprises alkaline earth metal halides or alkali metal halides or mixtures thereof as such halides are chemically stable and less likely to react with the at most partially solidified molten metal.

The at most partially solidified molten metal is preferably an aluminium alloy. Fractional crystallisation is particularly suited for aluminium. Recycling aluminium is cost effective in view of the production of primary aluminium being very energy intensive and expensive and it is often necessary to reduce the amount of a foreign element or elements in recycled aluminium in order to obtain a required chemical composition.

The present invention will be further explained by way of example with reference to the accompanying schematic FIGS. 1 to 3.

Figure 1:
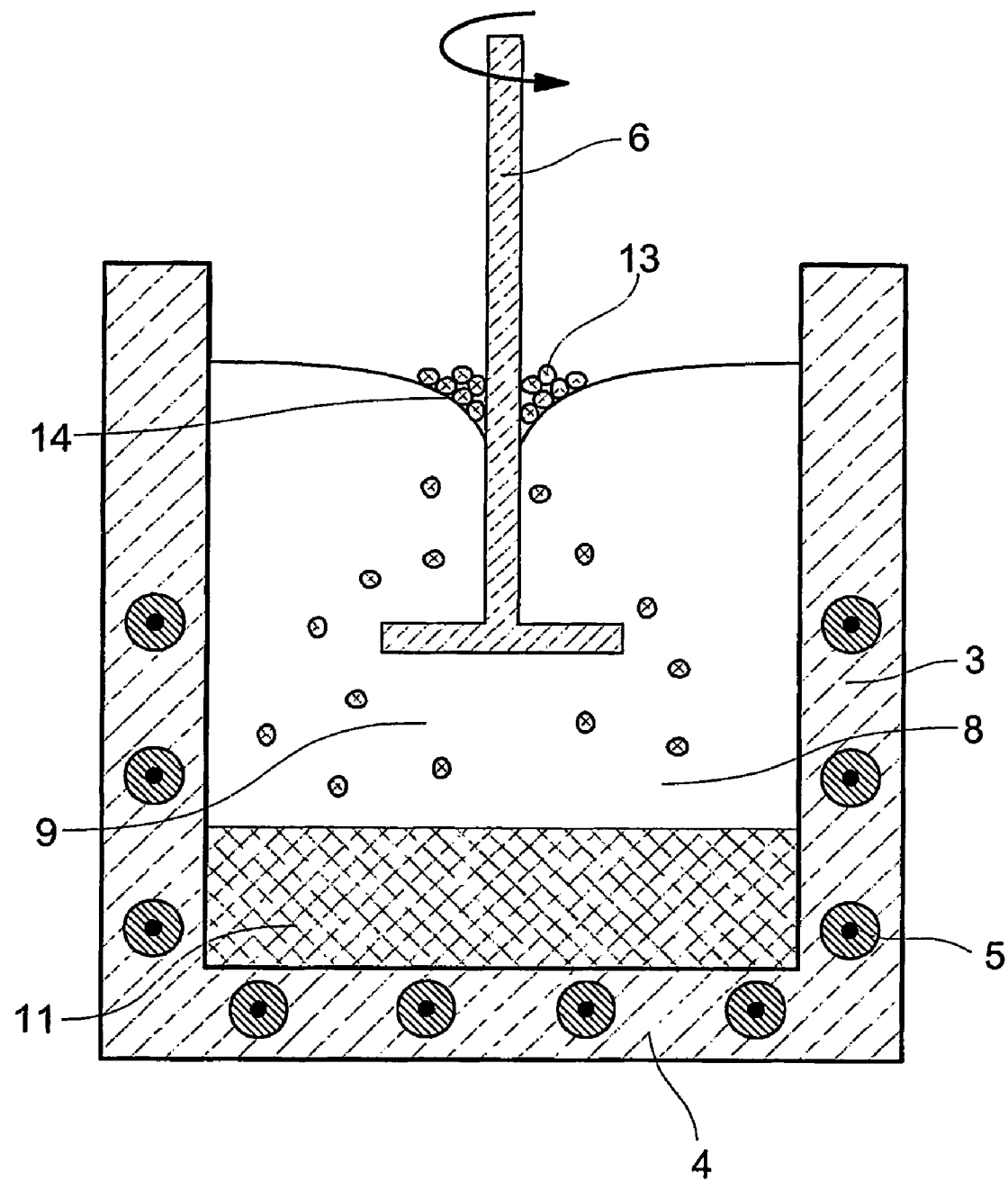
FIG. 1 shows a cross section through a crystallisation apparatus in which the cooling method according to the invention is implemented.

FIG. 1 shows a crystallisation apparatus for implementing the method according to the invention. The apparatus comprises a chamber 9 surrounded by walls 3 and floor portion 4. The apparatus may comprise a lid but this is not shown in the figure. The walls 3 and floor portion 4 are preferably heated by embedded heating elements or pipes 5. The apparatus comprises a stirrer or impeller 6. The rotating motion of the stirrer 6 generates a vortex 14 in the at most partially solidified molten metal 8 which extends up to the surface of the molten metal. The solid salt 13 is dropped or strewn onto the surface of the at most partially solidified molten metal 8 and is preferably oriented to fall into the vortex 14 created by the stirrer so the solid salt is drawn into the body of the at most partially solidified molten metal in the chamber of the apparatus. The salt melts as it has been selected to have a melting temperature below the melting temperature of the metal. The solid salt is also preferably selected to be of greater density once molten than the molten metal and thus forms a layer 11 beneath the at most partially solidified molten metal. Salt can be removed from the layer 11 and once removed may be cooled and solidified for re-use.

Figure 2:
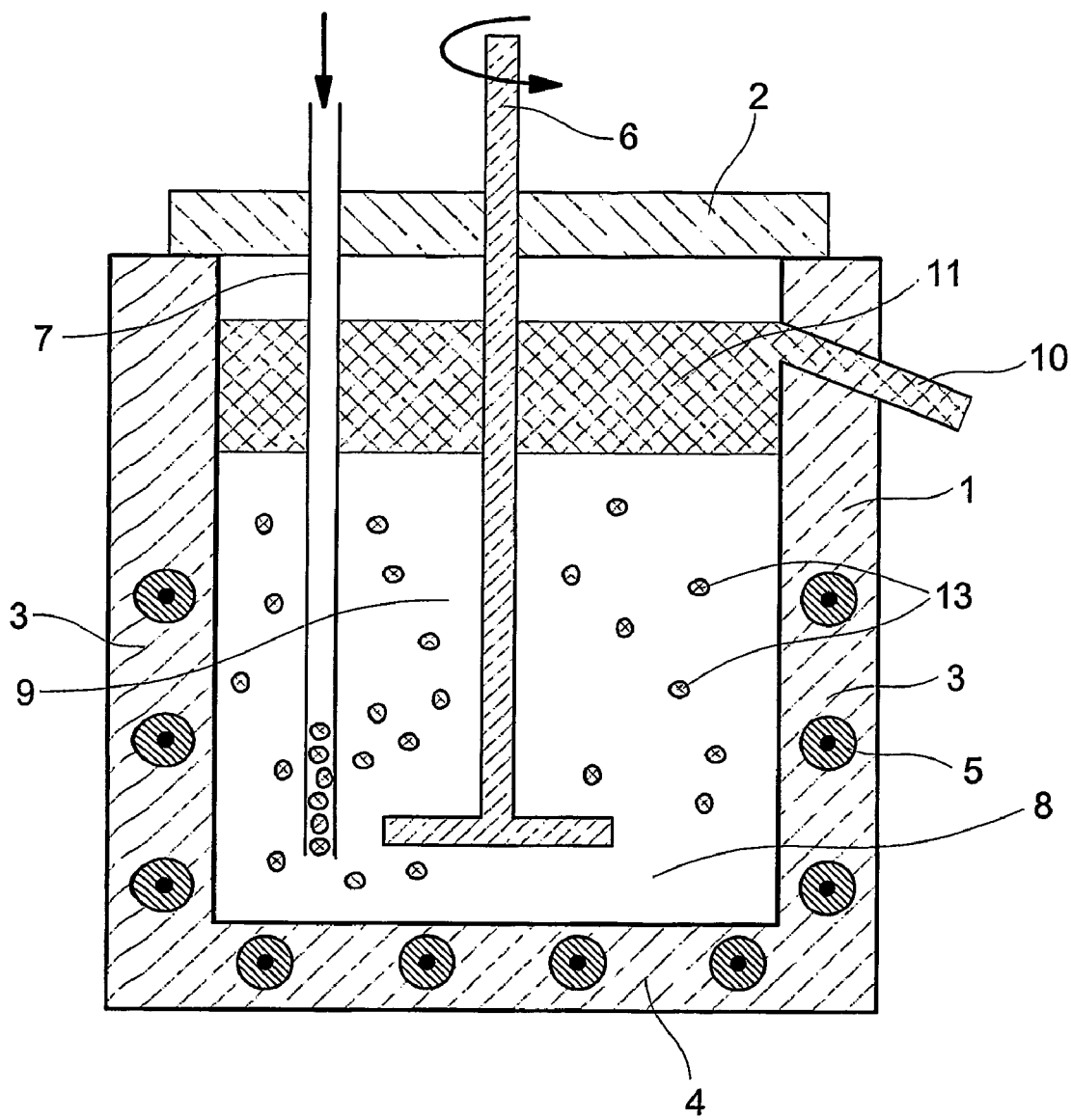
FIG. 2 shows a cross section through a further crystallisation apparatus in which the cooling method according to the invention is implemented.

FIG. 2 shows a crystallisation apparatus 1 for the fractional crystallisation of a molten metal containing one or more foreign elements. The apparatus comprises a chamber 9 surrounded by a lid 2, walls 3 and floor portion 4. The walls 3 and floor portion 4 are preferably heated by embedded heating elements or pipes 5. The apparatus also comprises a stirrer or impeller 6, which is rotated, and a pipe 7. Solid salt 13 in powder or fine-grained form along with inert gas under pressure is supplied to the at most partially solidified molten metal 8 through the pipe 7. The stirring of the at most partially solidified molten metal keeps the crystals in suspension and enhances the exchange of material between the crystals and the molten metal. The salt melts as its melting temperature is below the melting temperature of the at most partially solid molten metal. The salt once molten preferably has a lower density than that of the molten metal so the salt 13 rises through the at most partially solidified molten metal and forms a layer 11 on top of the metal and can be tapped off via outlet 10. Once tapped off the salt is cooled and solidified for re-use.

Figure 3:
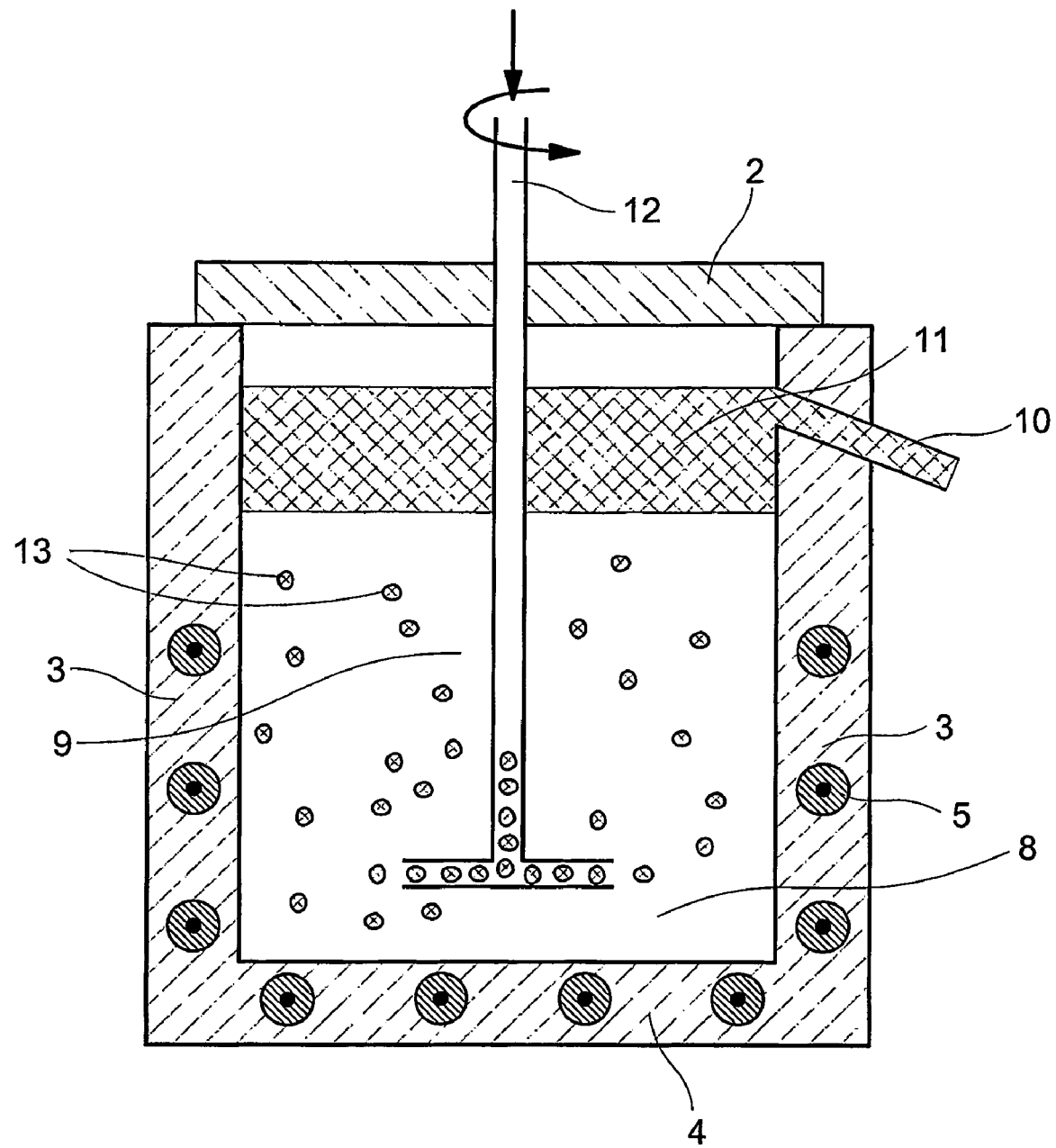
FIG. 3 shows a cross section through a further crystallisation apparatus in which the cooling method according to the invention is implemented.

FIG. 3 shows an alternative crystallisation apparatus for implementing the method according to the invention. The apparatus comprises a chamber 9 surrounded by a lid 2, walls 3 and floor portion 4. The walls 3 and floor portion 4 are preferably heated by embedded heating elements or pipes 5. The apparatus comprises a combined stirrer and supply pipe 12 for the solid salt. The solid salt 13 is supplied in powder or fine-grained form along with inert gas under pressure to the pipe 12. The gas and solid salt pass through a duct in the interior of the pipe 12 and exit into the at most partially solidified molten metal via at least two openings in the pipe. The pipe 12 is rotated to stir the at most partially solidified molten metal whilst the solid salt is being supplied to the at most partially solidified molten metal. The stirring of the at most partially solidified molten metal keeps the crystals in suspension and enhances the exchange of material between the crystals and the molten metal. The salt once molten preferably has a lower density than that of the molten metal so the salt 13 rises through the at most partially solidified molten metal 8 and forms a layer 11 on top of the metal and can be tapped off via outlet 10. Once tapped off the salt is cooled and solidified for re-use.

The at most partially solidified molten metal 8 is preferably aluminium alloy. The solid salt added may have a density once molten greater than or lower than the density of the molten metal. The salt may thus ultimately form a layer above and in contact with the upper surface of the molten metal or may form a layer beneath and in contact with the lower surface of the molten metal. The solid salt added may also have a composition such that some of the salt once molten forms a layer above the molten metal and some forms a layer below the molten metal. The solid salt may be supplied directly onto the upper surface of the at most partially solidified molten metal and/or may be supplied onto and/or into a salt layer in contact with the upper surface of the at most partially solidified molten metal. The solid salt may be supplied below the lower surface of the at most partially solidified molten metal directly to the lower surface and/or into and/or below a salt layer in contact with the lower surface of the at most partially solidified molten metal. The solid salt may be supplied both above and below the at most partially solidified molten metal. The solid salt may be supplied in for example powder, pellet, lump or large blockform. The solid salt may simply be dropped or immersed into the at most partially molten metal. The solid salt may also be supplied enclosed in another material such as for example in a form comprising a solidified coating of the molten metal.

The solid salt preferably has a melting point below the melting point of aluminium metal and more preferably below 500° C. to ensure the salt stays molten even when forming part of a salt layer positioned above or below the at most partially solid molten metal. The solid salt added preferably comprises halide salts such as alkaline earth metal halides or alkali metal halides or mixtures thereof as such salts are chemically stable and are less likely to react with the molten metal. More preferably the solid salt comprises sodium chloride and magnesium chloride that have respective melting points of 720° C. and 780° C. but in combination can have a significantly lower melting point. Even more preferably approx 60% NaCl and approx 40% $MgCl_2$ is used to achieve a combination of a melting point below 500° C. and chemical stability.

Typical values for cooling effectiveness of solid salt for molten aluminium alloy metal at a temperature of 660° C. are:

1 kg solid salt added at a temperature of 20° C.

1 kg×1000 J/kg° C.×(660-20)° C.=640 kJ (heating salt)

1 kg×300 kJ/kg=300 kJ (melting salt)

Total energy absorbed=940 kJ latent heat of fusion of aluminium=390 kJ/kg

Thus to produce 1 kg of aluminium crystals from molten aluminium alloy at 660° C. the amount of salt required for cooling is approx 0.4 kg (390/940 kg).

A reasonable production rate from a crystallisation apparatus containing 500 kg of molten aluminium alloy is 100 kg crystals per hour. Thus to obtain a crystal production rate of 100 kg per hour, 40 kg of solid salt should be supplied per hour.

The lid 2 and/or the layer of molten salt 11 formed in the chamber of the crystallisation apparatus may be heated to a temperature above the melting point of aluminium metal to ensure crystals of aluminium metal do not form on for example the stirrer and/or supply pipe 6,7,12.

Alternatively, elements such as the stirrer and/or supply pipe 6,7,12 could be heated to above the melting temperature of aluminium to avoid encrustation with metal crystals.

The invention claimed is:

1. A method comprising:

cooling an at most partially solidified molten metal during fractional crystallisation, wherein metal crystals formed have a purer composition than that of the molten metal, wherein salt in solid form is used to cool the at most partially solidified molten metal.

2. Method according to claim 1, wherein the salt is chosen that melts at least partially during the cooling of the at most partially solidified molten metal.

3. Method according to claim 1, wherein at least some of the salt is removed once the salt is molten.

4. Method according to claim 3, wherein the removed salt is cooled and solidified.

5. Method according to claim 1, wherein the solid salt is added from above and/or to below and/or into the at most partially solidified molten metal.

6. Method according to claim 1, wherein the at most partially solidified molten metal is stirred.

7. Method according to claim 6, wherein the at most partially solidified molten metal is stirred by a stirrer, wherein the solid salt is added to a vortex formed on the surface of the at most partially solidified molten metal by the motion of the stirrer.

8. Method according to claim 6, wherein the at most partially solidified molten metal is stirred by a means for stirring and solid salt is added into the at most partially solidified molten metal through the means for stirring.

9. Method according to claim 6, wherein the solid salt is chosen to have a lower density once molten than that of the at most partially solidified molten metal.

10. Method according to claim 1, wherein the solid salt comprises alkaline earth metal halides or alkali metal halides or mixtures thereof.

11. Method according to claim 1, wherein the metal is aluminium alloy.

12. Method according to claim 3, wherein the removed salt is cooled and solidified and re-used for cooling at most partially solidified molten metal.

* * * * *